Figure 1:
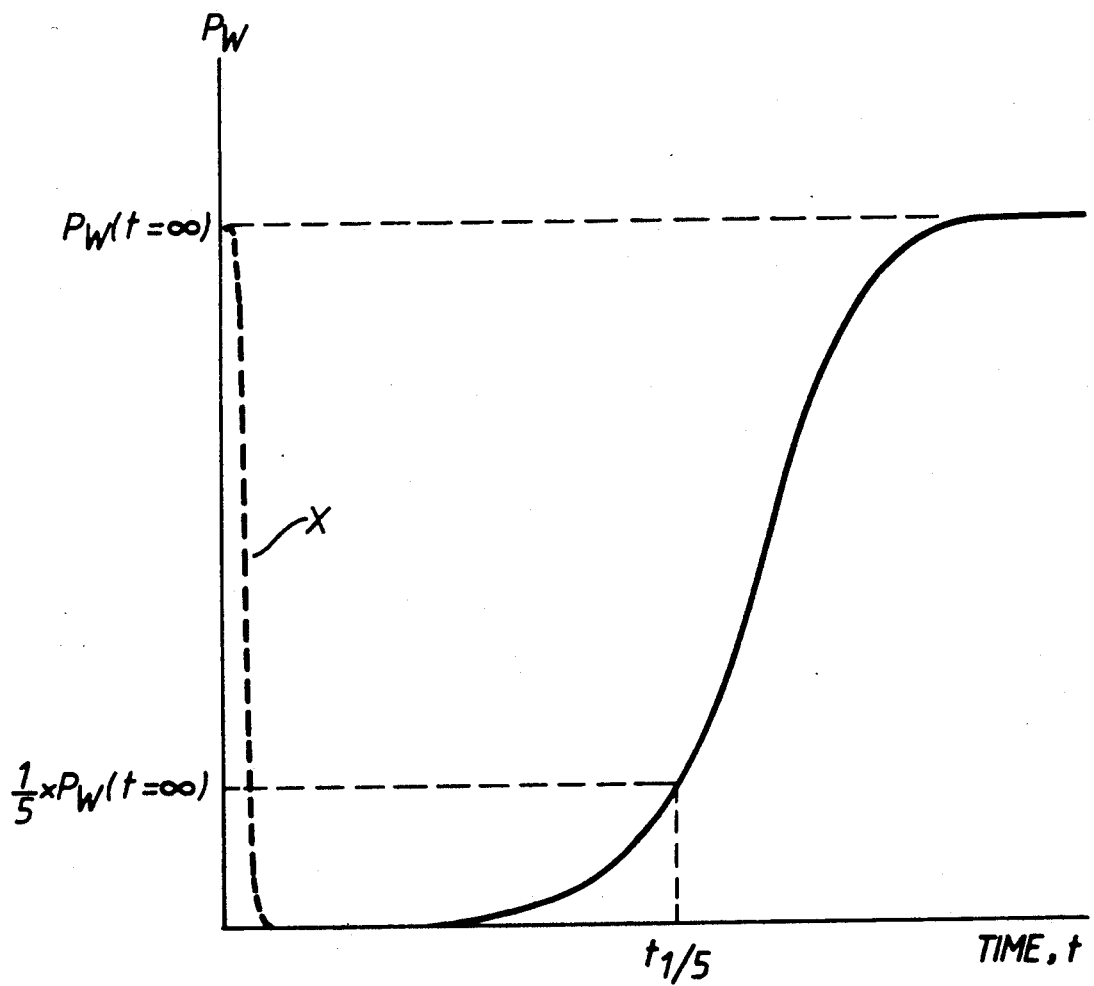

United States Patent [19]

Cochran et al.

[11] Patent Number: 5,239,016
[45] Date of Patent: Aug. 24, 1993

[54] PROCESS FOR PRODUCTION OF A WALL FOR A PACKAGE

[75] Inventors: Michael A. Cochran, Wantage; Rickworth Folland, Faringdon; James W. Nicholas, Wantage; Melvin E. R. Robinson, Oxfordshire, all of England

[73] Assignee: CMB Packaging (UK) Limited, Worcester, England

[21] Appl. No.: 438,441

[22] Filed: Jan. 16, 1990

Related U.S. Application Data

[63] Continuation-in-part of Ser. No. 340,416, Mar. 23, 1989, Pat. No. 5,221,515, and a continuation-in-part of Ser. No. 375,957, Jul. 6, 1989, abandoned.

[51] Int. Cl.$^5$ .............. C08K 5/00; C08K 5/09; B32B 27/16; B65D 81/26
[52] U.S. Cl. .............. 525/371; 252/188.28; 264/512
[58] Field of Search .............. 525/371; 252/188.28; 264/512

[56] References Cited

U.S. PATENT DOCUMENTS

| | | | |
|---|---|---|---|
| 3,586,514 | 6/1971 | Vjibrief | 524/303 |
| 4,048,361 | 9/1977 | Valyi | 428/36.6 |
| 4,381,277 | 4/1983 | Nilsson | 264/512 |
| 4,384,972 | 5/1983 | Nakamura et al. | 252/188.28 |
| 4,604,257 | 8/1986 | Smith et al. | 264/512 |
| 4,618,386 | 10/1986 | Yatsu et al. | 264/512 |
| 4,728,549 | 3/1988 | Shimizu et al. | 264/153 |
| 4,980,211 | 12/1990 | Kushida et al. | 264/512 |
| 5,021,515 | 6/1991 | Cochran et al. | 252/188.28 |
| 5,049,624 | 9/1991 | Adams et al. | 252/188.28 |

FOREIGN PATENT DOCUMENTS

| | | | |
|---|---|---|---|
| 0083826 | 7/1983 | European Pat. Off. | |
| 0045152 | 2/1972 | Japan | 524/378 |
| 2212102 | 7/1989 | United Kingdom | 264/512 |

OTHER PUBLICATIONS

H. F. Mark, "Encyclopedia of Polymer Science and Engineering", vol. 2, 1985, pp. 84–85 (Page 85, para. 3).

Primary Examiner—Paul R. Michl
Assistant Examiner—Peter Sakely
Attorney, Agent, or Firm—Burns, Doane, Swecker & Mathis

[57] ABSTRACT

A process for the production of a wall for a package including producing a preform of the wall and stretching the preform of the wall where the preform includes a layer containing a polymer and having oxygen-scavenging properties. The preform and the stretching ratios applied are chosen (i) so that the time ($t_J$) which the permeance of the wall for oxygen would take to rise to 1/5 of the value it would have in the absence of oxygen scavenging would be at least 10 days and (ii) if the preform were stretched at that time ($t_J$) after the preform were produced, the time ($t_D$) which the permeance of the wall for oxygen would take to rise 1/5 of the value it would have in the absence of scavenging would be at least ¼ of the time ($t_J$). The time between completion of step (A) and the commencement of step (B) is at least 10 days.

25 Claims, 4 Drawing Sheets

PROCESS FOR PRODUCTION OF A WALL FOR A PACKAGE

CROSS-REFERENCE TO RELATED APPLICATIONS;

This application is a continuation-in-part of U.S. application Ser. No. 07/340,416, filed Mar. 23, 1989 now U.S. Pat. No. 5,021,515 and U.S. application Ser. No. 07/375,957, filed Jul. 6, 1989, now abandoned.

The present invention relates to packaging, especially packaging of oxygen-sensitive materials, most especially of foods and beverages.

Packaging, whether rigid, semi-rigid, flexible, lidded, or collapsible, or a combination of these, serves not merely to contain the material being packaged but, depending on the nature of the material, to prevent ingress of harmful substances from the environment. Oxygen from the atmosphere has long been regarded as one of the most harmful substances for many packaged materials, especially foodstuffs.

Packaging made exclusively of glass or metal can provide an extremely good barrier both to egress of all substances from the package (especially water and carbon dioxide) and to ingress of all substances from the environment. Packaging made of polymers in whole or in part generally performs far less well in both these respects. This has restricted for many years the use of polymers in packaging, despite the great advantages of polymers. These advantages derive from the diversity of polymers themselves in mechanical, thermal, and optical properties and from the diversity and adaptability of fabrication techniques for polymers, allowing flexible bags, rigid containers, and clinging films to be made, the package wall being homogeneous, laminated, or coated. Compared with glass and metal packages, polymer packages are generally light and compared with glass are generally less breakable. There are also cost advantages with some polymers.

Polyethylene terephthalate is a major packaging polymer, used particularly for bottles for carbonated beverages. It is over twenty times less permeable than polypropylene while still having a practically significant permeability. There are extremely impermeable polymers such as copolymers of ethylene and vinyl alcohol, of vinylidene chloride and vinyl chloride, and of m-xylylenediamine and adipic acid ("MXD6"); but for practical or cost reasons these tend to be used as thin layers on or between polyethylene terephthalate or (in the case of MXD6) for blending with polyethylene terephthalate, in low percent quantities, still leaving practically significant permeability. For instance, oriented blends of polyethylene terephthalate (96%) and MXD6 (4%) are about 70% as permeable as polyethylene terephthalate. Chemical Abstracts, 1984, volume 100, abstract 100: 193165x, being an abstract of Japanese published patent application 58 160344, gives some information on these blends.

We believe that there is considerable potential for extending the use of polymers by means of oxygen-scavenging systems. In these, oxygen reacts chemically as it is transmitted inwards towards the package contents. Accordingly, transmission of oxygen inwards to the package contents is reduced, not necessarily with any improvement in the performance of the package with respect to inward transmission of other substances such as nitrogen or water vapour or outward transmission of substances.

Among substances that we believe can then be more satisfactorily packaged with polymers we would particularly mention beers (especially lager beers), wines (especially white ones), fruit juices, some carbonated soft drinks, fruits, nuts, vegetables, meat products, baby foods, coffee, sauces, and dairy products. Almost all foods and beverages are likely to display some benefit.

An early proposal relating to oxygen-scavenging is described in U.S. Pat. No. 3,856,514 (published in 1972!). This describes most particularly the addition of 0.8% to 2% by weight of antioxidants to hard polyvinyl chloride. Antioxidants exemplified are 2,2'-methylene-bis-(4-methyl-6-t-butylphenol) and 2,2'-dihydroxy-3,3'-dicyclohexyl-5,5'-dimethyldiphenylmethane. The best permeability value reported is twenty times lower than that of the polyvinyl chloride without the antioxidant. Experimental evidence on the duration of the effect is not given.

U.S. Pat. No. 4,048,361 (published in 1977) describes a multilayer structure in which a barrier layer such as an acrylonitrile-containing polymer, a terephthalate polyester, polyvinylidene chloride, a cellulosic material, or an elastomer is adhered to a layer comprising a carrier such as a polyolefin, polystyrene, and polyvinyl chloride and an antioxidant. No quantitative experimental investigation of the barrier properties is described. The use of antioxidants with polyethylene terephthalate is not specifically disclosed; in this respect it may be noted that antioxidants are not added to polyethylene terephthalate conventionally. (The conventional use of antioxidants is the suppression of oxidation of polymers, such oxidation in a package being regarded generally as undesirable.)

More recently, Rooney has described scavenging systems which operate by oxidation of organic materials such as 1,3-diphenylbenzofuran when illuminated in the presence of a dyestuff (Chem. Ind., 1979, 900–901; J. Food Science, 1981, 47, 291–298; Chem. Ind., 1982, 197–198). These systems have the disadvantage for use with, say, beer bottles that it is not practical to arrange for each bottle to be illuminated during storage.

As well as these proposals to use organic materials as scavengers there have been proposals to use inorganic reducing agents as follows: iron powder (Japanese published patent application 55 106519, published in 1980); hydrogen gas packed with the product (UK patent 1,188,170, published in 1970); and sulphites (UK patent specification 1,572,902, published 1980, and European published patent application 83 826 published 1983). There has been some commercial application of inorganic reducing agents. However, special packing procedures are of course necessary if hydrogen is used, and the use of sulphites and of iron requires special procedures for wall fabrication because of their poor compatibility with polymers.

Some discussion of the conventional measurements and units of oxygen permeation is appropriate at this point. The measurement is made by exposing a package wall of area A to a partial pressure p of oxygen on the one side and to an essentially zero partial pressure of oxygen on the other. The quantity of oxygen emerging on the latter side is measured and expressed as a volume rate $dV/dt$, the volume being converted to some standard conditions of temperature and pressure. After a certain time of exposure (usually a few days) $dV/dt$ is generally found to stabilise, and a $P_W$ value is calculated from the equation (1).

$$dV/dt = P_W A p \quad (1)$$

$P_W$ in the present specification and claims is called the permeance of the wall. (Analogy with magnetic permeance and electrical conductance would suggest that $P_W$ should be described as "permeance per unit area", but we are following the nomenclature in Encyclopaedia of Polymer Science and Technology, Vol. 2, Wiley Interscience, 1985, page 178.) The standard conditions for expressing dV/dt used generally and in this specification are 0° C. and 1 atm (1 atm=101 325N m$^{-2}$). If the thickness of the area of wall is substantially constant over the area A with value T and the wall is uniform through the thickness (i.e. the wall is not a laminated or coated one) then the permeability of the material in the direction normal to the wall is calculated from the equation (2).

$$dV/dt = P_M A p/T \quad (2)$$

For non-scavenging materials, $P_W$ and $P_M$ are to a reasonable approximation independent of t, p, and T although they are often appreciably dependent on other conditions of the measurement such as the humidity of the atmosphere on the oxygen-rich side and the temperature of the measurement.

For oxygen-scavenging walls, $P_W$ and $P_M$ are functions of t because the concentrations and activity of scavenger vary with time (particularly as the scavenger is consumed). This has not prevented us usually from measuring $P_W$ and $P_M$ reasonably accurately as a function of time (the changes in dV/dt being relatively gradual once the normal initial equilibration period of a few days is over). However, it should be recognised that, whereas after a few days' exposure to the measurement conditions a non-scavenging wall achieves a steady state in which dV/dt is equal to the rate of oxygen ingress to the wall, a scavenging wall achieves an (almost) steady state in which dV/dt is considerably less than the rate of oxygen ingress to the wall. This being the case, it is likely that $P_W$ calculated from (1) is a function of p as well as of t and that $P_M$ in (2) is a function of p and T as well as of t. $P_W$ and $P_M$ for scavenging walls are, strictly speaking, not true permeances and permeabilities at all (since permeation and scavenging are occurring simultaneously) but, rather, apparent ones. However, we have chosen to retain the conventional terms "permeance" and "permeability". So long as the conditions of the measurement are sufficiently specified they are suitable for characterising the walls in a manner relevant to the packaging user (i.e. in terms of the oxygen emerging from the wall).

All values of $P_W$ and $P_M$ hereinafter in this specification (except where stated otherwise) are to be understood to refer to conditions in which p=0.21 atm, the relative humidity on the oxygen-rich side of the wall is 50%, the temperature is 23° C. and (in the case of $P_M$ values), the thickness of the wall is 0.3 mm. Conditions close to the first three of these, at least, are conventional in the packaging industry.

Further, as will be appreciated from the above discussion of the papers by Rooney, it is possible for $P_W$ and $P_M$ to be affected by the illumination of the wall under test. All $P_W$ and $P_M$ values hereinafter, and indeed all references to oxidation, oxidisability, and oxygen-scavenging properties, refer to the dark or else to conditions of irradiation not appreciably contributing to oxygen-scavenging.

Our copending UK patent application 88 15699.7, our case 4001, describes and claims in one aspect a wall for a package, which wall comprises, or includes a layer comprising, a composition comprising a polymer and having oxygen-scavenging properties, characterised in that the composition scavenges oxygen through the metal-catalysed oxidation of an oxidisable organic component thereof. (Corresponding EPC and PCT application numbers are 88306175.6 and GB/8800532 respectively; all the applications are due to be published, the UK application under number GB 2207439A. This PCT application has issued as U.S. Pat. No. 5,021,515.) The entire disclosure of the aforesaid U.S. Patent in relation to the invention there claimed in all its aspects is incorporated herein by this reference. However, it is convenient here to note the following points regarding the aforesaid wall:

(i) The oxidisable organic component may be an oxidisable polymer. The use of an oxidisable polymer as the oxidisable organic component has the advantage, broadly speaking, over the use of an oxidisable non-polymeric component that it is less likely to affect adversely the properties of a non-oxidisable polymer with which is it blended. It is possible for an oxidisable polymer to be used as the sole polymer in the composition, serving a dual function as polymer and oxidisable organic component.

(ii) It is of course possible for two or more polymers, two or more oxidisable organic components, or two or more catalysts to be used. It is possible also for a metal catalyst to be used in combination with a non-metal catalyst.

(iii) The word "catalyst" is used in a general way readily understood by the man skilled in the art, not necessarily to imply that it is not consumed at all in the oxidation. It is indeed possible that the catalyst may be converted cyclically from one state to another and back again as successive quantities of oxidisable component are consumed by successive quantities of oxygen. However, it may be that some is lost in side reactions, possibly contributing directly to oxygen-scavenging in small measure, or indeed that the "catalyst" is more properly described as an initiator (e.g. generating free radicals which through branching chain reactions lead to the scavenging of oxygen out of proportion to the quantity of "catalyst").

(iv) Polyesters and polyolefins are especially suitable as non-oxidisable polymeric components, especially ethylene terephthalate or ethylene naphthalate polyesters. Oxidisable organic components include amides, especially polyamides and most especially MXD6. Metal catalysts include cobalt, copper, and rhodium compounds.

Oxygen-scavenging, whether in accordance with our copending applications or in accordance with other proposals, implies consumption of a material in the wall of the package. This will be progressively consumed, so that the high barrier to oxygen must in principle be of limited duration. The time dependence of permeance of a wall is, we believe, essentially as shown by the bold line in FIG. 1, in which the wall is formed at time t=0.

To be of commercial interest, the time axis in FIG. 1 is of the order of days, or tens or hundreds of days.

In the scavenging systems described in our copending applications we have sometimes observed that there may be a time delay between the formation of a wall and the full appearance of the scavenging effect. In these cases FIG. 1 for low times is modified essentially as shown by the dashed curve marked X in the Figure.

For the purpose of the present specification, the quantity $t_{1/5}$ shown in FIG. 1 is of significance, being the time required for $P_W$ to reach 1/5 of the value $P_W$ ($t=\infty$) that it would have in the absence of scavenging. The standard storage conditions in between $P_W$ measurements at different times for the purposes of determining $t_{1/5}$ are storage in air (p=0.21 atm) at 23° C. and 50% relative humidity, both surfaces of the wall being exposed. Storage is in the dark or conditions of illumination not appreciably contributing to oxygen-sacavenging. Any feature similar to curve X in FIG. 1 is ignored in evaluating $t_{1/5}$. $P_W(t=\infty)$ may be determined in any one of several ways, or at least a lower limit put upon $P_W(t=\infty)$, as follows:

(I) The full form of the curve in FIG. 1 is determined experimentally. This is of course very time consuming if the oxygen-scavenging capacity of the wall is very high.

(II) A wall is prepared in which the scavenging is absent but which is otherwise very similar ands its $P_W$ is measured. For instance, in catalysed scavenging systems it is often very reasonable to omit the catalyst and take $P_W$ measured in the absence of catalyst as $P_W(t=\infty)$ for the wall containing the catalyst.

(III) If scavenging appears fully only after a time delay, early measurements of $P_W$ put a lower limit on $P_W(t=\infty)$.

(IV) Oxygen-scavenging may be suppressed by cooling the wall and $P_W$ measured and adjusted to allow for the effect of changed temperature.

(V) Measurements of $P_W$ are made with an inert gas such as carbon dioxide, making due allowance for the difference between $P_W$ for that gas and for oxygen as observed in walls made of broadly similar non-scavenging materials.

There may in some circumstances be a significant quality control consideration arising from the diminution with time of the effectiveness of a wall. If for instance a beer bottle is made and supplied to a filler, it will be necessary to to require him to store the bottle prior to use in the absence of oxygen, or else to indicate to the filler the last date by which the bottle is to be filled. Storage in the absence of oxygen would be highly inconvenient in normal commercial practice. On the other hand, if the bottles are to be stored in air, the tendency will be to extend the usable lifetime of the bottle by use of higher proportions of oxidisable material in the wall or (if a catalyst is used) sometimes by increasing the amount of catalyst. However, such measures may have the disadvantages of (i) raising cost if (as is the case with, for instance, polyethylene terephthalate/MXD6/cobalt systems) the oxidisable component is more expensive than the principal polymeric component;

(ii) increasing the risk of incompatibility (difficulties in blending, "haze" (i.e. lack of transparency), depolymerisation of the host polymer by the oxidation catalyst); and (iii) raising levels of components beyond those permitted by regulation.

We have discovered that the rate at which the scavenging properties of a sheet of material decays is surprisingly highly dependent on the thickness of the sheet.

The present invention provides a process for the production of a wall for a package which comprises the steps of (A) producing a preform of the wall, and (B) stretching the preform to produce the wall, the time between the completion of step (A) and the commencement of step (B) being denoted by $t_{AB}$, characterised in that (i) the preform comprises, or includes a layer comprising, a composition comprising a polymer and having oxygen-scavenging properties, (ii) the preform and the stretching ratios in step (B) are such that $t_I \geq 10$ day and $t_D \geq 0.25\, t_I$, where $t_I$ is the $t_{1/5}$ of the wall that would be produced in a hypothetical process in which $t_{AB}=0$ day and $t_D$ is the $t_{1/5}$ of the wall that would be produced in a hypothetical process in which $t_{AB}=t_I$, and (iii) $t_{AB} \geq 10$ day.

In the determination of $t_D$, the standard storage conditions during the time period $t_{AB}$ are storage in air (p=0.21 atm) at 23° C. and 50% relative humidity. Storage in the dark or under conditions of illumination not appreciably contributing to oxygen-scavenging. Where the structure of a wall is completed by coating or lamination after Step (B), $t_I$ and $t_D$ are to be measured on the wall thus coated or laminated.

For the avoidance of any possible doubt, it is hereby stated that the abovementioned standard conditions are quoted merely for the purpose of permitting $t_I$ and $t_D$ to be estimated without ambiguity. In the process provided by the present invention, of course, the actual storage conditions during time period $t_{AB}$ will in general not be these standard conditions (although the standard conditions are indeed reasonably representative of commercial situations). A corresponding comment applies to storage during the period $t_{BC}$ referred to later.

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity in the time period between steps (B) and (C) denoted herein by $t_{BC}$. There are also more general design considerations in relation to multilayer structures; these are set out in our copending patent application 88 15699.7 (our case 4001), in the eight paragraphs immediately preceeding the introduction to the Examples.

The word "preform" is to be understood herein as any intermediate structure which on stretching (usually at elevated temperature) yields the desired wall. Among well-known types of preform are the following:

(1) Tubes rounded off at one end and open at the other intended for conversion into bottles open at one end.
(2) Tubes open at both ends for conversion into (e.g. cylindrical) container sides or into film.
(3) Tubes open at both ends intended for conversion into bottles by a process including pinching of the base.
(4) Sheet intended for conversion into thinner sheet or film.

The stretching may be by blowing and/or by mechanical gripping.

Among the techniques that may be considered for the production of the preform are moulding generally, injection moulding, extrusion, thermoforming, and (specifically for multilayer structures) co-extrusion and lamination with adhesive tie layers. The precise choice in any individual case will of course depend on the materials employed and the devised eventual structure and end use.

By "wall for a package" in the present specification and claims is included (except where the context indicates otherwise) not only a wall when incorporated into a package structure but also packaging materials capable of forming walls, such as package bases, packaging sheet, and so on.

The advantage of the process provided by the present invention can be readily seen by considering the situation when one adds the eventual third step (C) filling the package with an oxygen-sensitive product.

As previously mentioned, the time between the completion of step (B) and the commencement of step (C) is herein denoted by $t_{BC}$. For definiteness in this consideration, we shall take a specific case of a bottle filled with beer.

Suppose a preform is made, converted into a bottle immediately (contrary to the invention), and filled with beer after time $t_{BC}$ equal to $t_I$, during which time time bottle is stored in air at 23° C. and 50% relative humidity. Then at the time the bottle is filled, the $P_W$ of the wall will be 1/5 of that of a bottle made with a non-scavenging composition, and rising in absolute terms quite rapidly, and the oxygen reaching the beer will begin to damage it noticeably, reducing the permissible filling-to-consumption time for the beer.

Suppose on the other hand, the preform is stored for time $t_I$ (i.e. $t_{AB}=t_I$) before conversion into the bottle and the bottle is filled immediately ($t_{BC}=0$). In accordance with the invention, it will be at least a further 0.25 $t_I$ before the bottle begins to admit oxygen at the rate initially experienced in the first case where the invention is not employed. This will extend the permissible filling-to-consumption time for the beer, without any increase in total storage time (preform and bottle taken together).

Even if in a particular commercial situation where, for the majority of bottles, $(t_{AB}+t_{BC})>>t_I$, a small advantage will be achieved even for the majority of bottles; but more importantly, the advantage will be present for the minority where $(t_{AB}+t_{BC})$ is of the same order as or much greater than $t_I$ (especially $\geq 0.25 t_I$, more especially $\geq 0.5 t_I$, most especially $\geq 1.0 t_I$). If the present invention is not employed there is a risk that, if there is any mismatch between the demand for step (C) and the supply from step (A), bottles from step (B) will have to be discarded or even worse that filled bottles from step (C) will have to be discarded, assuming the mismatch is identified. Such identification would require extra control procedures, in the absence of which the worst case would have to be assumed and the filled bottles emerging from step (C) would have to be marked with cautious (early) "Consume by" dates. The control procedures would be expensive, and the use of early "Consumed by" dates would diminish customer satisfaction on account of his increased wastage of "past-date" product.

Generalising these considerations, we believe that the present invention is of considerable advantage where any one or more of the following applies:

$(t_{AB}+t_{BC}) \geq 0.25 t_I$, especially 0.5 $t_I$, most especially 1.0 $t_I$;

$t_{AB} \geq 0.25 t_I$, especially 0.5 $t_I$, most especially 1.0 $t_I$;

$0 \leq (t_{BC}/\text{day}) \leq 8x (t_I/\text{day})^{\frac{1}{2}} - 16$; and (3)

$t_I \leq 500$ day, especially $\leq 300$ days, more especially $\leq 200$ day, most especially $\geq 100$ day.

In (3) above, the root reflects the fact that when a composition of high scavenging performance is used (i.e. when $t_I$ is large), the application in question is likely to have more stringent upper limits on $P_W$.

While, as indicated in the previous paragraph, the present invention becomes progressively more advantageous the smaller is $t_I$, we presently believe that in commercial practice $t_I$ will most commonly be at least 30 day.

The present invention may be applied with the use of any oxygen-scavenging system. However, the use of the oxygen-scavenging systems described in our abovementioned copending applications is especially preferred. Other systems that may be used in principle are uncatalysed systems displaying appropriate $t_I$. Among those that may be considered for suitability are those described in U.S. Pat. No. 3,586,514 and those based on inorganic reducing agents incorporated in polymers such as iron, lower oxides or hydroxides of iron, sulphites, or haemoglobin or similar inorganic complexes.

The present invention will now be further described by way of illustration only, by means of the following Examples.

EXAMPLES AND COMPARATIVE EXAMPLES

The materials used in these Examples and Comparative Examples were of the grades specified below. Further information was obtained by our own measurements or from the manufacturers' literature.

Polyethylene terephthalate, grade B90N, from ICI of UK. This is a polymer of ethylene glycol with terephthalic acid. It was found to contain 35 ppm cobalt, 25 ppm sodium, 38 ppm phosphorus, and 32 ppm antimony, with <1 ppm of copper, germanium, iron, manganese, and titanium. The intrinsic viscosity in a o-chlorophenol is 0.82.

MXD6, grade Reny 6001, from Mitsubishi Gas Chemicals of Japan. This is a polymer of meta-xylylenediamine $H_2NCH_2-m-C_6H_4-CH_2NH_2$ with adipic acid $HO_2C(CH_2)_4CO_2H$. The relative viscosity of the polyamide is 2.1, for a solution in 95% aqueous sulphuric acid containing 1 g of polymer per 100 cm$^3$ of solution.

Cobalt Siccatol, from Akzo Chemie ("Siccatol" is a trade mark). This is a solution in white spirit of $C_8$–$C_{10}$ cobalt carboxylates. The concentration of cobalt (as metal) is 10% by weight relative to the solution.

Granules of the polyethylene terephthalate and of the MXD6 were mixed by hand in a tray together with the Siccatol solution in the relevant proportions for Examples 1 to 3 as indicated in the Table. The mixture in each case was then heated at 100° C. for 18 hours in a recirculating dehumidified air dryer (this to remove water from the two polymers so as to avoid degradation in injection moulding, as well as incidentally; driving off unevaporated white spirit).

The three mixtures were then used to make rounded-end preforms for one-litre cylindrical bottles. The injection moulding was performed on a Krauss Maffei KM 150 machine. The mass of each preform was approximately 33 g. The wall thickness of the preform was 3.65 mm, and its internal and external surface areas were 0.005 m² and 0.007 m² respectively.

One preform of each composition was used for each of Examples 1 to 3 and one for each of Comparative Examples 1 to 3.

In each of Examples 1 to 3, the respective preform was stored in air for time $t_{AB}$ as indicated in the Table before being reheated and blown to form the bottle with biaxial orientation (i.e. circumferential and longitudinal orientation). For this, a Corpoplast BMB3 stretch blow moulding machine was used. The bottle had a wall thickness of 0.3 mm.

The three bottles were tested for oxygen permeance on an OXTRAN machine 10/50 A made by Mocon Inc of USA. The conditions of the tests were as set out earlier in this specification.

Figure 2:
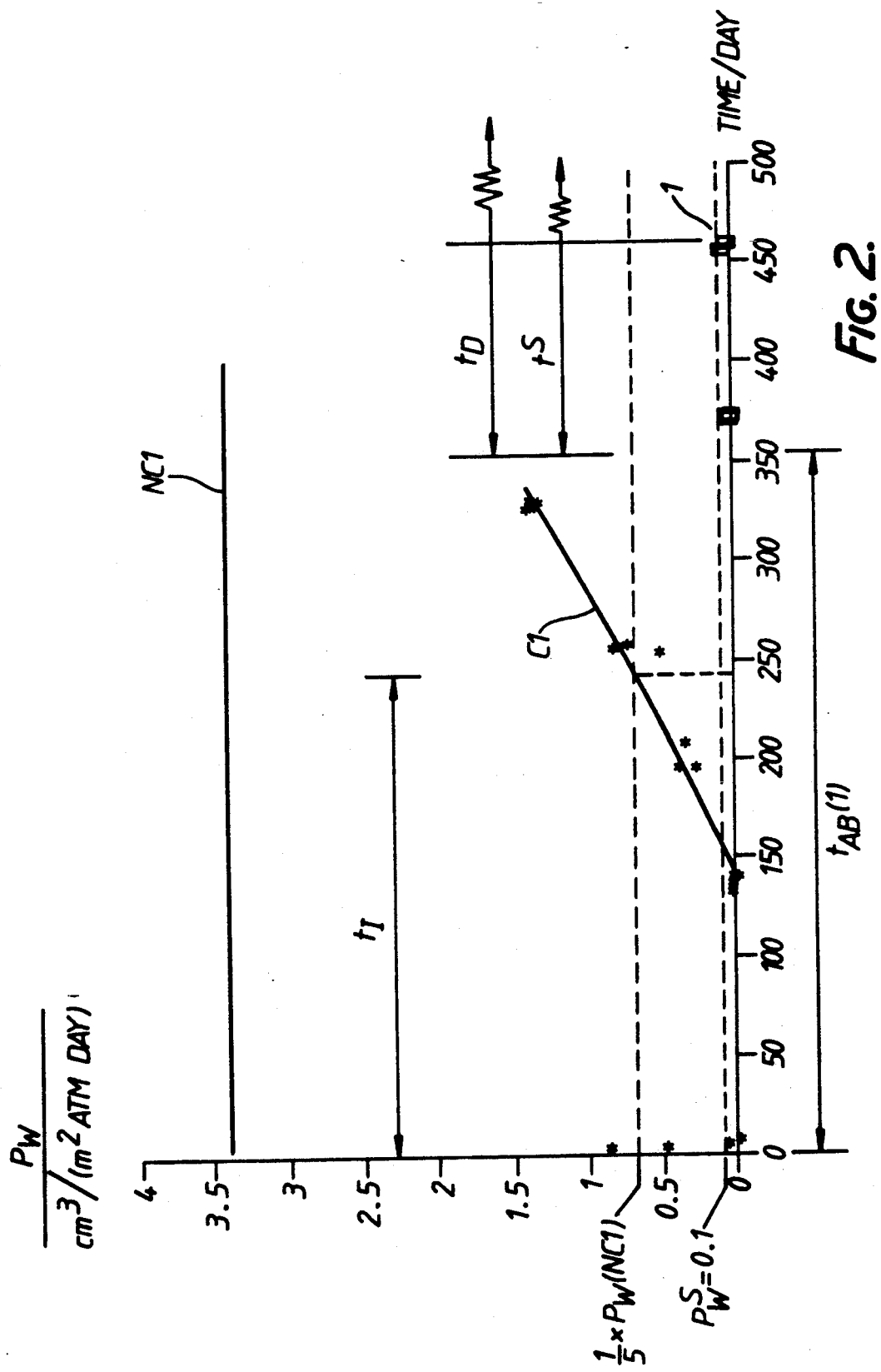
Figure 3:
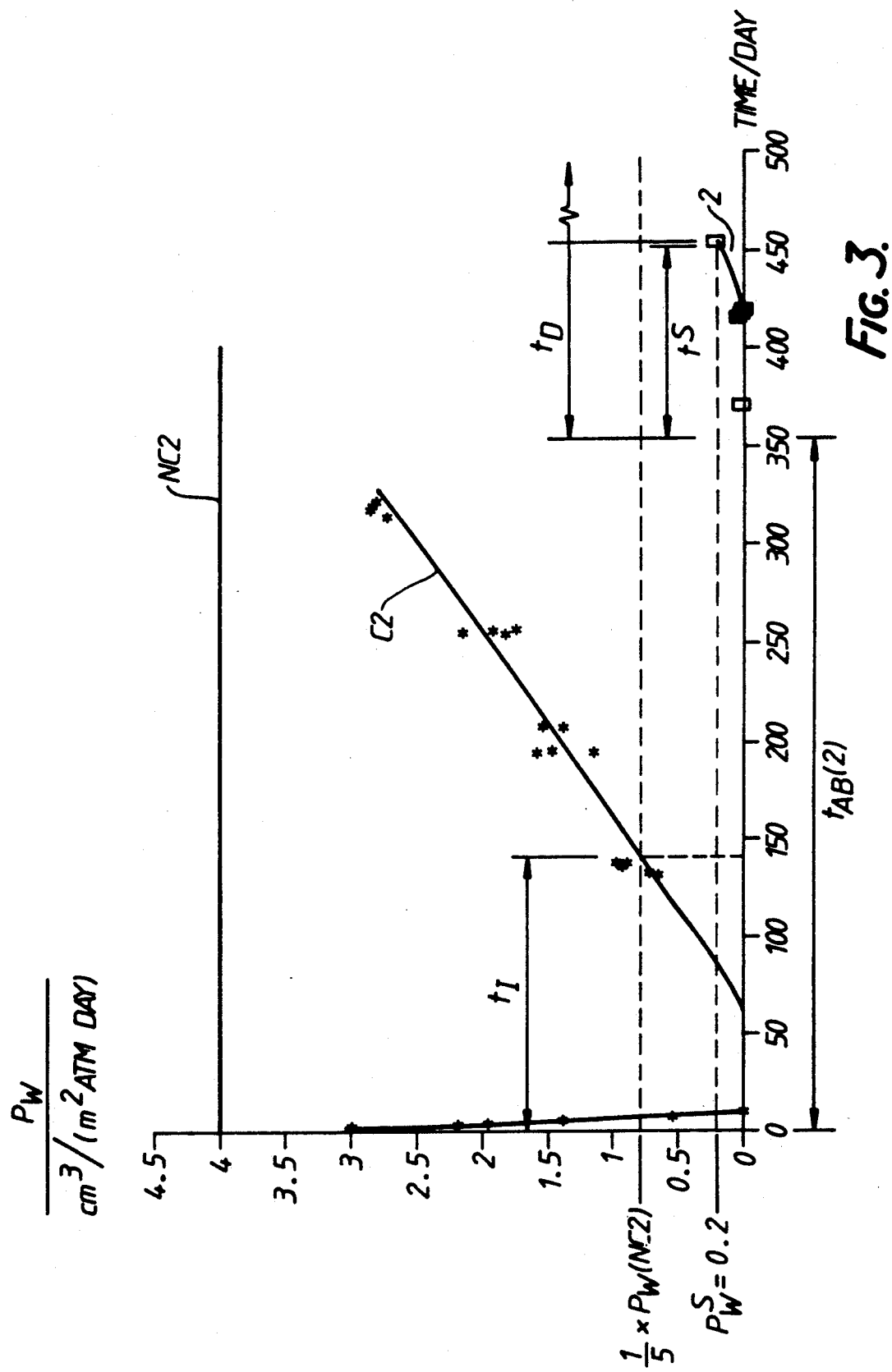
Figure 4:
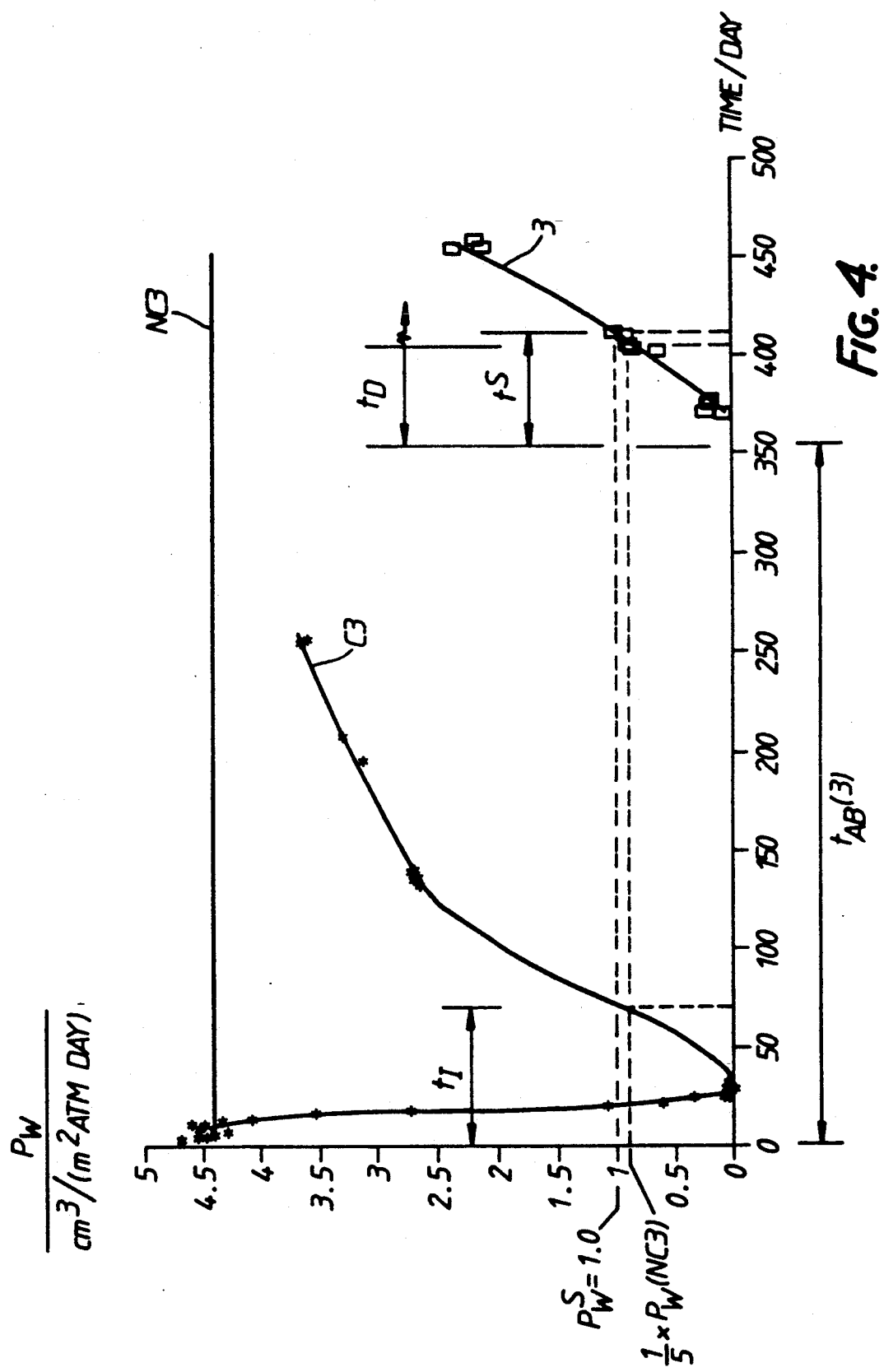

Tests were performed at various times after the bottle had been manufactured. In between tests, the bottles were stored with air both inside and out. Each test lasts 3 to 4 days until the bottle (as is usual) "equilibrates" from its storage conditions (exposed to the air inside and out) to the test conditions. The OXTRAN results for Examples 1, 2 and 3 are shown graphically by lines 1, 2, and 3 respectively in FIGS. 2, 3, and 4 respectively. The permeances in FIGS. 2 to 4 are calculated from the OXTRAN result by using equation (1) above on the basis of an oxygen partial pressure of 0.21 atm and a bottle area of 0.0575 m². The bottle wall being essentially uniform, they may be converted into permeabilities in cm³mm/(m²atm day) for the material by multiplying them by 0.3 in accordance with equation (2).

The Comparative Examples C1 to C3 were performed in like manner, except that the preform was reheated and blown into a bottle immediately after its production. The OXTRAN results are displayed as curves C1 to C3 in FIGS. 2 to 4 respectively.

In FIGS. 2 to 4 are also plotted, non-scavenging comparisons NC1 to NC3 based on values observed, or calculated from reported $P_M$ values, for similar bottles made from the same polymer components in which the oxygen-scavenging effect is absent (no addition of cobalt).

It follows from the discussion above of the determination $t_{1/5}$ that method (II) above can be used in this case, i.e. that each of NC1 to NC3 defines $P_W(t=\infty)$ for each of C1 to C3 and 1 to 3. Since the bottles of C1 to C3 were blown with $t_{AB}=0$, the C1 to C3 OXTRAN results were used to evaluate $t_I$ for Examples 1 to 3. By using the $P_W(t=\infty)$ and $t_I$ values thus obtained together with the OXTRAN results of Examples 1 to 3, the $t_D$ values for Examples 1 to 3 were obtained. Because in all the Examples $t_{AB} > t_I$ and because of lack of data for large t in some cases, all the $t_D$ values are lower limits. The calculations are shown graphically in FIGS. 2 to 4, and the values obtained for $t_I$, $t_D$, and $t_D/t_I$ are given in the Table.

Also calculated from the results were values $t_S$, being the time period before the bottles' permeance $P_W$ rose above a somewhat subjective acceptability limit $P_W^S$ for likely applications of each respective composition used in Examples 1 to 3. The values of $P_W^S$ taken are given in the Table, the derivation of $t^S$ is shown graphically in FIGS. 2 to 4, and the resulting $t^S$ values are given in the Table. The assumption behind the $P_W^S$ values is that, for instance, a person using the relatively high-performance composition of Example 1 and Comparative Example C1 would be working to a more demanding specification than someone using the composition of Example 3 and Comparative Example C3 at the other extreme.

Finally, in Table 1 is given the value of $t_{BC}$ derived from relationship (3) above. The general correctness of this formula in practical situations will be apparent by comparing the $t_{BC}$ values with the $t_S$ values. Operation in accordance with relationship (3) in these Examples ensures that after the bottle is filled there is at least a significant time period for which the $P_W$ of the bottle is below $P_W^S$.

By way of broad comment on the results obtained, the following points can be made:

1. The compositions used in Comparative Examples 1 to 3 display, albeit for a time period which decreases with reduced MXD6 content, very high scavenging power, as indicated by the difference between the C1 to C3 and NC1 to NC3 curves respectively.
2. The very prolonged storage of the preforms in Examples 1 to 3 results in little more than the time-shifting of the curves of Comparative Examples C1 to C3—i.e. remarkably little of the scavenging power has been lost during storage of the preforms. The bottles of C1 to C3 had fallen beneath the subjective acceptability limit $P_W^S$ long before the preforms were blown in Examples 1 to 3.
3. In the extreme case, the bottle of Comparative Example C1 was almost non-scavenging long before the bottle of Example 3 was blown. For a $(t_{AB}+t_{BC})$ of (say) 150 days on some bottles in a commercial operation, the composition of Example 3 would be highly unsatisfactory without the use of the present invention. By using the present invention, however, with $t_{AB}$ and $t_{BC}$ as indicated in the Table, the composition can be used much more satisfactorily, with the attendant advantages resulting from low MXD6 content (low haze and low cost).

TABLE

| Example No. | Components and respective weight fractions | $t_I$/day | $t_{AB}$/day | $t_D$/day | $t_D/t_I$ | $P_W^S$ cm³/(m² atm day) | $t^S$/day | $t_{BC}$/day calculated from relationship (3) |
|---|---|---|---|---|---|---|---|---|
| 1 | MXD6 4%; Co (added as Siccatol) 50 ppm; Balance PET | 240 | 355 | >>105 | >>0.42 | 0.1 | >105 | ≦108⁻ |
| 2 | MXD6 2%; Co (added as Siccatol) | 140 | 355 | >105 | >0.75 | 0.2 | 100 | ≦79⁻ |

TABLE-continued

| Example No. | Components and respective weight fractions | $t_I$/day | $t_{AB}$/day | $t_D$/day | $t_D/t_I$ | $\dfrac{P_w S}{cm^3/(m^2 \text{ atm day})}$ | $t^S$/day | $t_{BC}$/day calculated from relationship (3) |
|---|---|---|---|---|---|---|---|---|
| 3 | 50 ppm; Balance PET MXD6 1%; Co (added as Siccatol) 50 ppm; Balance PET | 70 | 355 | >55 | >0.79 | 1.0 | 60 | $\leq 51^-$ |

NOTE: The compositions in the above Table for Examples 1 to 3 are identical with those used in Comparative Examples C1 to C3, and (save for the presence of catalyst) with those of non-scavenging comparisons NC1 to NC3.

We claim:

1. A process for the production of a wall for a package which comprises the steps of
   (A) producing a preform of the wall, and
   (B) stretching the preform of the wall, -the time between the completion of step (A) and the commencement of step (B) being denoted by $t_{AB}$, the preform comprising, or including a layer comprising, a composition comprising a polymer and having oxygen-scavenging properties, wherein the preform and the stretching ratios applied to it in step (B) are chosen so that
   (i) if the preform were stretched on the same day as the preform was produced ($t_{AB}=0$ day), the time $t_I$ which the permeance of the wall for oxygen would take to rise to 1/5 of the value it would have in the absence of oxygen scavenging would be at least 10 days (($t_I \geq 10$ days) and
   (ii) if the preform were stretched at that time $t_I$ after the preform was produced ($t_{AB}=t_I$), the time $t_D$ which the permeance of the wall for oxygen would take to rise to 1/5 of the value it would have in the absence of scavenging would be at least 1/4 of the time $t_I$ ($t_D \geq 0.25\, t_I$) and
   the time between completion of step (A) and the commencement of step (B) is at least 10 days ($t_{AB} \geq 10$ days).

2. A process according to claim 1, wherein $t_I \leq 500$ day.

3. A process according to claim 1, wherein $t_I \leq 200$ day.

4. A process according to any one of claims 1 to 3, wherein $t_{AB} \geq 0.25\, t_I$.

5. A process according to any one of claims 1 to 3, wherein $t_{AB} \geq 0.5\, t_I$.

6. A process according to any one of claims 1 to 3, wherein $t_{AB} \geq 1.0\, t_I$.

7. A process according to any one of claims 1 to 3, wherein the wall has a permeance for oxygen in the absence of scavenging of less than 50 cm$^3$/(m$^2$ atm day).

8. A process according to any one of claims 1 to 3, wherein the wall has a permeance for oxygen in the absence of scavenging in the range from 1.5 to 30 cm$^3$/(m$^2$ atm day).

9. A process according to any one of claims 1 to 3, wherein the wall has a permeance for oxygen in the absence of scavenging in the range from 3.0 to 18 cm$^3$/(m$^2$ atm day).

10. A process according to claim 4, wherein the wall has a permeance for oxygen in the absence of scavenging of less than 50 cm$^3$/(m$^2$ atm day).

11. A process according to claim 4, wherein the wall has a permeance for oxygen in the absence of scavenging in the range 1.5 to 30 cm$^3$/(m$^2$ atm day).

12. A process according to claim 4, wherein the wall has a permeance for oxygen in the absence of scavenging in the range from 3.0 to 18 cm$^3$/(m$^2$ atm day).

13. A process according to anyone of claims 1 to 3, wherein the composition scavenges oxygen through the metal-catalysed oxidation of an oxidisable organic component thereof and wherein the oxidisable organic component is a polyamide containing units of the formula $$-CO-NH-CH_2-\text{arylene}-CH_2-NH-CO-.$$

14. A process according to anyone of claims 1 to 3 wherein the composition scavenges oxygen through the metal-catalysed oxidation of an oxidisable organic component thereof and wherein the metal catalyst is a compound of cobalt, copper, or rhodium.

15. A process according to claim 4, wherein the composition scavenges oxygen through the metal-catalysed oxidation of a polyamide therein and wherein the metal catalyst is a compound of cobalt, copper, or rhodium.

16. A process according to any one of claims 1 to 3, wherein the polymer is formally a condensation polymer of one or more aromatic dicarboxylic acids with one or more compounds containing at least two alcoholic hydroxy groups per molecule.

17. A process according to any one of claims 1 to 3, wherein the polymer is a polyolefin.

18. A process for producing a package filled with an oxygen-sensitive product which comprises producing a wall for the package according to any one of claims 1 to 3 and filling the package with the oxygen-sensitive product.

19. A process according to claim 18, wherein the package is filled time $t_{BC}$ after the production of the wall is complete and $$(t_{AB}+t_{BC}) \geq 0.25\, t_I.$$

20. A process according to claim 18, wherein the package is filled time $t_{BC}$ after the production of the wall is complete and $$(t_{AB}+t_{BC}) \geq 1.0\, t_I.$$

21. A process according to claim 18, wherein the time $t_{BC}$ in days between production of the wall and filling of the package is more than zero and less than eight times the square root of $t_I$ (as defined in claim 21) minus 16.

22. A process for producing a package filled with an oxygen-sensitive product which comprises producing a wall for the package according to claim 4, and filling the package with the oxygen-sensitive product.

23. A process according to claim 22, wherein the package is filled time $t_{BC}$ after the production of the wall is complete and $$(t_{AB}+t_{BC}) \geq 0.25\, t_I.$$

24. A process according to claim 22, wherein the package is filled time $t_{BC}$ after the production of the wall is complete and $$(t_{AB}+t_{BC}) \geqq 1.0 t_I.$$

25. A process according to claim 22, wherein the time $t_{BC}$ in days between production of the wall and filling of the package is more than zero and less than eight times the square root of $t_I$ (as defined in claim 21) minus 16.

* * * * *

UNITED STATES PATENT AND TRADEMARK OFFICE
CERTIFICATE OF CORRECTION

PATENT NO. : 5,239,016

DATED : August 24, 1993

INVENTOR(S) : Michael A. COCHRAN et al.

It is certified that error appears in the above-indentified patent and that said Letters Patent is hereby corrected as shown below:

On the cover page, in column 1, delete

"[22] Jan. 16, 1990" and insert therefor
-- [22] PCT Filed: Jan. 26, 1989

[86] PCT No.: PCT/GB/89/00071
      § 371 Date:     Jan. 16, 1990
      § 102(e) Date:  Jan. 16, 1990

[87] PCT Pub. No.:    WO90/08636
      PCT Pub. Date:   Aug. 9, 1990 --

On the cover page, in column 1, in item

[63], kindly delete "Pat. No. 5,221,515" and insert therefor
-- Pat. No. 5,021,515 --

Signed and Sealed this

Twelfth Day of April, 1994

Attest:

BRUCE LEHMAN

Attesting Officer    Commissioner of Patents and Trademarks